United States Patent Office 2,955,109
Patented Oct. 4, 1960

2,955,109

PROCESS FOR THE PRODUCTION OF DL-α-AMINO-CAPROLACTAM

Carl Max Brenner, Riehen, near Basel, and Hans Rudolf Rickenbacher, Basel, Switzerland, assignors to Geigy Chemical Corporation, Ardsley, N.Y., a corporation of Delaware No Drawing. Filed Feb. 25, 1958, Ser. No. 717,311

Claims priority, application Switzerland Mar. 15, 1957

2 Claims. (Cl. 260—239.3)

The present invention concerns a new process for the production of DL-α-amino-caprolactam, a valuable intermediate product for the production of lysine.

The stereoisomeric α-amino-caprolactams can easily be hydrolysed to form the corresponding lysines, for example with diluted hydrochloric acid. L(−)-α-amino-caprolactam as well as DL-α-amino-caprolactam would therefore be excellently suitable as starting materials for the preparation of L(+)-lysine if they could be obtained in a simple manner and not just from the latter by lactamisation and, possibly, racemation.

It has now surprisingly been found that DL-α-amino-caprolactam can be obtained in excellent yields if caprolactam is chosen as starting substance. This is treated first with phosphorus oxychloride, then with phosphorus pentachloride and finally with sulphuryl chloride; the α.α-dichloro-caprolactim chloride is decomposed with water; and the α.α-dichloro-caprolactam so obtained is reacted with catalytically activated hydrogen in the presence of one mol of an inorganic or organic base, the DL-α-chloro-caprolactam obtained is reacted with a salt of hydrozoic acid and the resultant DL-α-azido-caprolactam is reacted with catalytically activated hydrogen.

In the first step, phosphorus oxychloride serves not only as solvent but also as reactant; some of the caprolactam is thus changed into caprolactim chloride. To complete the conversion of the former into caprolactim chloride, it is reacted in the cold with about half a mol of phosphorus pentachloride. An amount of at least 2 mols of sulphuryl chloride is added to the reaction mixture in the cold and then the temperature is slowly raised to about 40° to substitute the hydrogen atoms in the α-position. After partial distillation off of the phosphorus oxychloride in the vacuum, the reaction mixture can be poured onto ice whereupon the α.α-dichloro-caprolactim chloride is immediately decomposed. In this way, α.α-dichloro-caprolactam is obtained in crude yields of 75–80% of the theoretical whereas J. von Braun and A. Heymons, B. 63, 502, (1930) could only obtain yields of 30–40% of the theoretical when using phosphorus pentachloride as sole chlorinating agent in benzene.

The catalytic hydrogenation which follows in the second step can be performed for example in the presence of Raney-nickel in methanol as solvent. Alkali hydroxides, alkali carbonates or tertiary organic bases can be used for example as bases. With methanol as solvent, the use of triethanolamine is particularly advantageous as the triethanolamine hydrochloride crystallises out during the hydrogenation in coarse granular form and so does not block the catalyst. It remains fully active therefore until the termination of the reaction. The triethanolamine hydrochloride can then easily be filtered off under suction and the base regained therefrom. The DL-α-chloro-caprolactam is obtained in yields of 85–90% of the theoretical. The compound was first obtained by H. Schechter and J. C. Kirk, J. Am. Chem. Soc. 73, 3091, (1951) in a yield of 31.4% by reacting hydrozoic acid with 2-chloro-cyclohexanone.

In the third step, an alkali azide, in particular sodium azide, can be used for example as salt of hydrozoic acid and the reaction thereof with the DL-α-chloro-caprolactam is performed in a neutral aqueous/alcoholic or aqueous/acetonic solution. On cooling the reaction solution, the DL-α-azido-caprolactam crystallises direct in good purity and in a yield of 80–85% of the theoretical. The compound has not heretofore been described; it melts at 106–108°.

Also the catalytic hydrogenation as the last reaction is easy to perform; for example Raney-nickel can be used as catalyst and alcohol as solvent. If the hydrogenation is performed at normal pressure, the nitrogen liberated can be removed by continually passing through hydrogen. The development of nitrogen has no influence on the course of the reaction if the hydrogenation is performed under pressure. On distilling the crude hydrogenation product, the DL-α-amino-caprolactam is obtained in yields of 90–94% of the theoretical.

The following example further illustrates the method of performing the reaction according to the present invention. Parts are given as parts by weight and their relationship to parts by volume is as grammes to cubic centimeters. The temperatures are in degrees centigrade.

*Example*

(a) Production of α.α-dichloro-caprolactam. 460 parts (=275 parts by volume, 3 mols) of phosphorus oxychloride are cooled in a vessel fitted with a stirrer, thermometer, dropping funnel and a reflux condenser to which a gas delivery tube is attached, to an inner temperature of 0°. 226.3 parts (2 mols) of pulverised, dried caprolactam are added in portions while stirring during which addition the temperature must never exceed 10°. After about 30 minutes a clear solution has been obtained. To complete the conversion of the acid amide into the lactim chloride, 230 parts (1.1 mols) of phosphorus pentachloride are added in portions to the solution which has been cooled to 2° to 5°, during which addition the temperature again must not exceed 10°. The suspension obtained is stirred for another 2 to 3 hours at 2–5°. While still cooling externally, 555 parts (=333 parts by volume, 4.1 mols) of sulphuryl chloride are added dropwise at first very slowly and carefully, during which addition the temperature must remain between 0° and 5° and, on completion of the dropwise addition, the whole is stirred for another 2 hours within the temperature range given. On then slowly heating the mixture a pale yellow, clear solution is obtained; at 25° sulphur dioxide and HCl gas begin to develop. It is heated to 40° and stirred for 1 hour at this temperature, then some of the phosphorus oxychloride is distilled off by connecting the reaction mixture, heated to 35–40°, to a water-jet vacuum for 90 minutes. The yellow oil which remains is poured in a thin stream on to 2.5 kg. of crushed ice, the ice being continuously stirred. The colourless crystallised α.α-dichloro-caprolactam is formed by decomposition of the lactim chloride. It is filtered off under suction, washed twice with water and dried in the vacuum at 50–60°. Yield: 275 to 291 parts, 75–80% of the theoretical.

The above product which still contains acid impurities is recrystallised from 280 parts by volume of methanol, sodium acetate being added to the hot, clear solution until the reaction is neutral. α.α-Dichloro-caprolactam crystallises from the hot filtered solution when it is cooled to about 0°. It is filtered off under suction and is washed twice with methanol, warmed to 5°. Yield: 223–237 parts, 61–65% of the theoretical. M.P. 124.5–126.5° corrected. The mother liquor is evaporated to ⅓ of its volume and water is added at the boil under it remains cloudy. After cooling to about 0° about 32 parts of yellowish product are obtained (9% of the theoretical). It melts at 120–124° corrected. Total yield of recrystallised product having a neutral reaction: 70–74% of the theoretical.

(b) Production of α-chloro-caprolactam. 91 parts (0.5 mol) of α,α-dichloro-caprolactam are dissolved in 550 parts by volume of methanol. 67.2 parts (0.45 mol) of triethanolamine and 5 parts of Raney-nickel which is poured in with 50 parts by volume of methanol, are added to this solution. Hydrogen is introduced at atmospheric pressure while shaking the solution. Within one to one and a half hours, 11,500–12,000 parts by volume of hydrogen have been taken up. At the same time triethanolamine hydrochloride crystallises out in the form of coarse granules. This hydrochloride and the catalyst are filtered off under suction and the filter residue is washed twice with methanol. The methanol in the filtrate is distilled off and the residue is dried in the vacuum at 95°. The crystallising green residue is then dissolved in 150 parts by volume of chloroform and the solution is shaken out with 150 parts by volume of 1 N-hydrochloric acid. The aqueous solution which has separated from the chloroform is shaken out twice with 50 parts by volume of chloroform each time. The combined chloroform extracts are dried with sodium sulphate, the chloroform is distilled off, the residue is dried in a water jet vacuum at 95°, recrystallised from 50 parts by volume of toluene, washed twice with 15 parts by volume of toluene each time and dried in the vacuum. Yield: 49 parts of DL-α-chloro-caprolactam, 67% of the theoretical; M.P. 91–93°. This product can be used for the next step of the reaction. Its purity is due to the fact that it can be distilled in the vacuum without residue and that a colourless distillate is obtained. After evaporation of the toluene mother liquor a crystallising oil remains. This consists of a mixture of di- and mono-chloro-caprolactam in a ratio of about 1:2. In the next addition it is mixed with the α,α-dichloro-caprolactam. In this case, for the hydrogenation 85 parts of α,α-dichloro-caprolactam, 18 parts of the residue of the mother liquor (containing about 6 parts of α,α-dichloro-caprolactam) and 67.2 parts of triethanolamine are used. When recrystallised from toluene, 63 parts of DL-α-chloro-caprolactam (91% of the theoretical calculated on the starting product newly added) are obtained and, on evaporating the toluene mother liquor, again about 18 parts of the residue of the mother lye are obtained.

(c) Production of α-azido-caprolactam. 36.7 parts of α-chloro-caprolactam (0.25 mol), 19.5 parts of sodium azide (0.3 mol), 20 parts by volume of 95% alcohol and 50 parts of water are heated in a vessel fitted with a reflux condenser for 24 hours on a steam bath. On cooling, finally at about 0°, the DL-α-azido-caprolactam crystallises out. It is filtered off under suction and washed once with 15 parts by volume of 20% alcohol and twice with 15 parts of water each time. Yield: 30–32.5 parts, 78–85% of the theoretical, M.P. 105–108° corrected.

(d) Production of α-amino-caprolactam. (1) At normal pressure: 60 parts by volume of 95% alcohol and 2 parts of Raney-nickel are placed in a vessel fitted with a vibro-mixer, gas introduction and gas delivery tube. After the addition of 6.17 parts of α-azido-caprolactam (0.04 mol) the development of nitrogen bubbles can be seen immediately. The air is replaced by hydrogen, then hydrogen is passed through the solution and the vibro-mixer is set in motion. After three hours, the catalyst is filtered off under suction, the filtrate is concentrated and distilled in the vacuum. The DL-α-amino-caprolactam boils at 162–165° under 11 mm. pressure. Yield: 4.60 parts, 90% of the theoretical.

(2) Process under pressure: 380 parts by volume of 95% alcohol, 5 parts of Raney-nickel and finally 77.1 parts (0.5 mol) of α-azido-caprolactam are placed in an autoclave which can be shaken. The pressure is adjusted to 70 atmospheres hydrogen and then the autoclave is shaked for three hours at room temperature. The catalyst is then filtered off under suction, the solvent is distilled off and the residue is distilled in the vacuum. DL-α-amino-caprolactam is obtained which boils at 168–172° under 13 mm. pressure at a bath temperature of 185–190°. Yield: 60 parts, 94% of the theoretical.

What we claim is:

1. DL-α-azido-ε-caprolactam.

2. In a process for the conversion of DL-α-chloro-ε-caprolactam to DL-α-amino-ε-caprolactam, the step of heating DL-α-chloro-ε-caprolactam with an alkali metal azide in solution in a mixture of water and a neutral water-miscible organic solvent, whereby the DL-α-azido-ε-caprolactam, which is convertible by catalytic hydrogenation into the DL-α-amino-ε-caprolactam, is produced.

References Cited in the file of this patent

UNITED STATES PATENTS

| 2,832,770 | Hopkins et al. | Apr. 29, 1958 |
| 2,876,218 | Francis et al. | Mar. 3, 1959 |

FOREIGN PATENTS

| 236,716 | Switzerland | July 16, 1945 |

OTHER REFERENCES

Block: Chem. Reviews, vol. 38 (1946), pp. 548–9.

Theilheimer: Synthetic Methods of Org. Chem., vol 7, pp. 20; 192 (1953).

Degering: Outline of Organic Nitrogen Compounds, p. 286 (1945).